(12) United States Patent
Abbiati

(10) Patent No.: US 8,615,152 B2
(45) Date of Patent: Dec. 24, 2013

(54) OPTICAL BRANCHING DEVICE

(75) Inventor: Fabio Abbiati, Milan (IT)

(73) Assignee: Prysmian S.p.A., Milan (IT)

( * ) Notice: Subject to any disclaimer, the term of this patent is extended or adjusted under 35 U.S.C. 154(b) by 179 days.

(21) Appl. No.: 13/335,617

(22) Filed: Dec. 22, 2011

(65) Prior Publication Data

US 2012/0163760 A1 Jun. 28, 2012

(51) Int. Cl.
*G02B 6/00* (2006.01)

(52) U.S. Cl.
USPC .............................. 385/135; 385/136; 83/861

(58) Field of Classification Search
USPC ................................... 385/134–138; 83/861
See application file for complete search history.

(56) References Cited

U.S. PATENT DOCUMENTS

| | | |
|---|---|---|
| 2010/0150504 A1 | 6/2010 | Allen et al. |
| 2010/0232752 A1 | 9/2010 | Labraymi et al. |

FOREIGN PATENT DOCUMENTS

| | | |
|---|---|---|
| EP | 2 216 662 A1 | 8/2010 |
| WO | WO 2009/110177 A1 | 9/2009 |
| WO | WO 2009/113112 A1 | 9/2009 |
| WO | WO 2009/114771 A1 | 9/2009 |

OTHER PUBLICATIONS

Italian Search report issued in copending Italian Application No. IT MI20102394, dated Aug. 17, 2011, 2 pgs.

*Primary Examiner* — Ellen Kim
(74) *Attorney, Agent, or Firm* — Finnegan, Henderson, Farabow, Garrett & Dunner, L.L.P.

(57) ABSTRACT

An optical branching device suitable for branching optical fibers extracted through an access window cut in a sheath of an optical cable. The optical branching device includes a central channel configured to house a portion of the optical cable, at least one lateral channel which branches from the central channel and which is configured to house at least one of the optical fibers, and a housing suitable for receiving a fixing member for fixing the device to the optical cable. The housing is in a non-projecting position relative to the lateral channel along a longitudinal direction of the central channel.

10 Claims, 6 Drawing Sheets

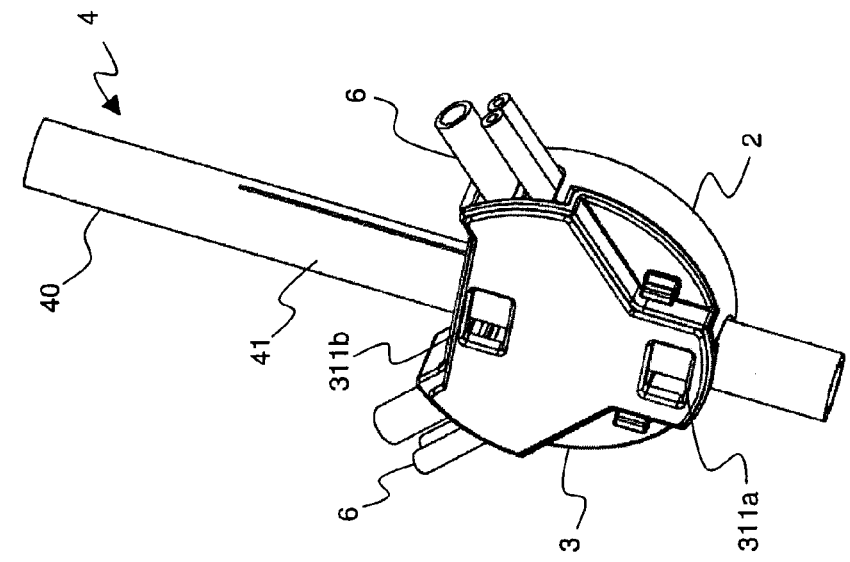
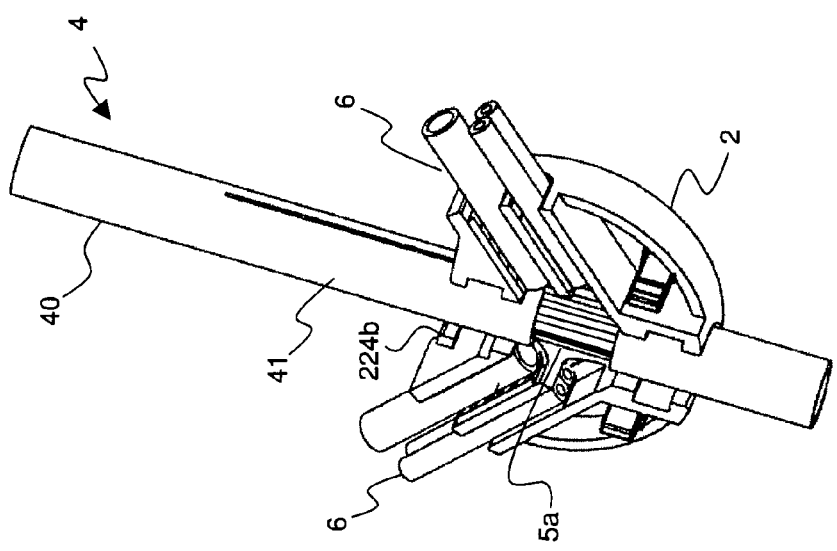
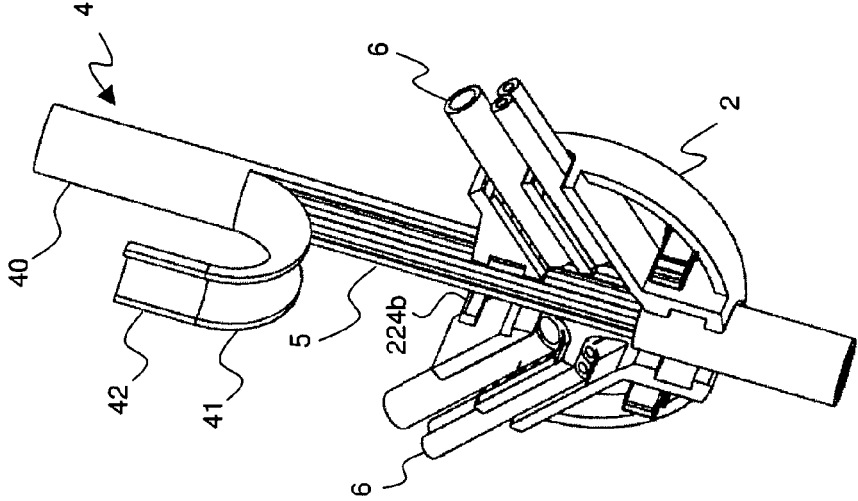

OPTICAL BRANCHING DEVICE

BACKGROUND OF THE INVENTION

1. Field of the Invention

The present invention relates to the field of equipment for installing optical access networks. In particular, the present invention relates to an optical branching device suitable for separating optical fibres extracted from a riser cable of an optical access network.

2. Description of the Related Art

An optical network of the type known as FTTP ("Fibre To The Premises") or FTTH ("Fibre To The Home") is an optical access network which supplies a number of end users with broadband or ultra-wideband communications services, in other words services which require data transmission speeds of several hundreds of Mbit/s or even higher speeds.

Typically, an FTTP or FTTH optical network comprises a distribution box which is typically positioned in the basement of the building in which the end users reside.

An optical cable, which will be referred to hereafter as a "riser cable", emerges from the distribution box and runs vertically inside the building from the basement to each floor. The riser cable comprises a plurality of optical fibres, typically up to 96 optical fibres, enclosed in an outer sheath. The riser cable is typically laid in a channel which provides mechanical protection for the cable. This channel can be fixed to the surface of a wall or can be housed in the thickness of the wall (in the concrete, for example). Inside the channel, the riser cable can run together with other cables, such as power distribution cables and telephone cables.

On each floor of the building, the optical riser cable typically passes through junction boxes together with the electrical and telephone cables.

In the portion of riser cable housed in the junction box, an access window can be cut in the riser cable sheath and one or more optical fibres can be extracted from it. Each extracted optical fibre can then be inserted into a corresponding protective tube known as a "drop tube", and can be extracted from the junction box and routed towards the apartment of a user residing on the floor in question. At any intermediate point between the access window and the user's apartment, the extracted optical fibre, protected by the tube, can be joined to a user optical cable, known as a "drop cable", which can be "pre-connectorized", meaning that it has an optical connector on its free end. The pre-connectorized end of the user cable is typically located in a suitable termination box in the user's apartment, in such a way that the user can connect it directly to his devices which use broadband services (such as a PC and a set-top box).

US 2010/0232752 describes an optical branching device suitable for receiving a portion of a riser cable in the sheath of which an access window has been cut to extract one or more optical fibres. The device has two shells at its opposite ends, which bear on the sheath of the riser cable. At the ends of the device there are also channels for receiving a strap or tape which partially surrounds the outer circumference of the shell and partially surrounds the circumference of the sheath of the riser cable, thus fixing the device to the cable. Between the shells, the device has a longitudinal recess which can be aligned with the access window in the sheath, thus exposing the optical fibres of the cable. The device also includes six outlet ports for guiding the optical fibres extracted from the cable. The ports are positioned obliquely with respect to the longitudinal recess.

SUMMARY OF THE INVENTION

The applicant has observed that the branching device described in US 2010/0232752 has the drawback of being too bulky to be installed in a junction box, which not only has very small dimensions (for example 8 cm by 8 cm), but also typically contains other electrical and/or telephone cables, which further reduce the space available for housing the branching device.

In view of the above, the object of the present invention is to provide an optical branching device which resolves the aforementioned problem, namely that the device has to be highly compact to allow it to be installed easily in the restricted space which is typically available in a junction box.

The applicant has observed that this object can be achieved by separating the function of branching the optical fibres from the riser cable (which is implemented inside the branching device) from the function of protecting the access window (which can also be implemented outside the branching device), and by concentrating the branching function in only one portion of the access window.

In particular, the applicant has observed that the problem can be resolved by using a branching device comprising a central channel for housing a portion of a riser cable, at least one lateral channel which branches obliquely from the central channel and which is suitable for housing at least one fibre extracted from the riser cable, and at least one housing suitable for receiving a fixing member (such as a strap, a catch, a tape, or the like) for fixing the device to the riser cable, in which the housing is in a non-projecting position relative to the lateral channel. Thus the overall dimension of the branching device in the longitudinal direction of the riser cable can be advantageously reduced relative to the known devices, being equal to 4 or 5 cm for example.

According to a first aspect of the invention, an optical branching device suitable for branching optical fibres extracted through an access window cut in a sheath of an optical cable comprises:

a central channel configured to house a portion of the optical cable;

at least one lateral channel which radiates from the central channel and which is configured to house at least one of the optical fibres; and at least one housing suitable for receiving a fixing member for fixing the device to the optical cable, wherein the housing is in a non-projecting position relative to the lateral channel along a longitudinal direction of the central channel.

Preferably, the lateral channel diverges by an acute angle from said central channel relative to the longitudinal direction.

Preferably, the acute angle formed by the lateral channel with the central channel is in the range from 30° to 60°.

Preferably, there are at least two lateral channels, located on opposite sides relative to the longitudinal direction.

Preferably, the lateral channels are located symmetrically on opposite sides relative to the longitudinal direction, and form a substantially Y-shaped guide structure.

Alternatively, there are two lateral channels, located on opposite sides relative to the longitudinal direction.

Preferably, the lateral channels are located in a portion of the access window, the portion having a length not greater than 50% of an overall length of the access window.

Preferably, each of the lateral channels has an inner surface with millings projecting towards the interior of the channel.

Advantageously, the device comprises a base and a cover, the central channel and the at least one lateral channel being arranged on the base, the cover being suitable for being coupled to the base for closing the device.

Preferably, the device also comprises a protection portion connected to the base, the protection portion being an extension of the central channel.

Preferably, the protection portion is connected removably to the base.

According to a second aspect of the invention, a process for branching optical fibres from an optical cable comprises:
cutting an access window in a sheath of an optical cable, thereby defining a patch of the sheath;
extracting the optical fibres from the optical cable through the access window;
arranging the optical fibres so that they divert from a longitudinal direction of the optical cable along a portion of the access window; and
covering at least a further portion of the access window with the patch of the sheath.

Preferably, the portion of the access window has a length not greater than 50% of an overall length of the access window.

BRIEF DESCRIPTION OF THE DRAWINGS

The present invention will be made clearer by the following detailed description, provided by way of non-limiting example, to be read with reference to the appended drawings, in which:

FIGS. 3a, 3b and 3c show three steps of the process of installing the device of FIG. 1;

DETAILED DESCRIPTION OF THE INVENTION

Figure 1:
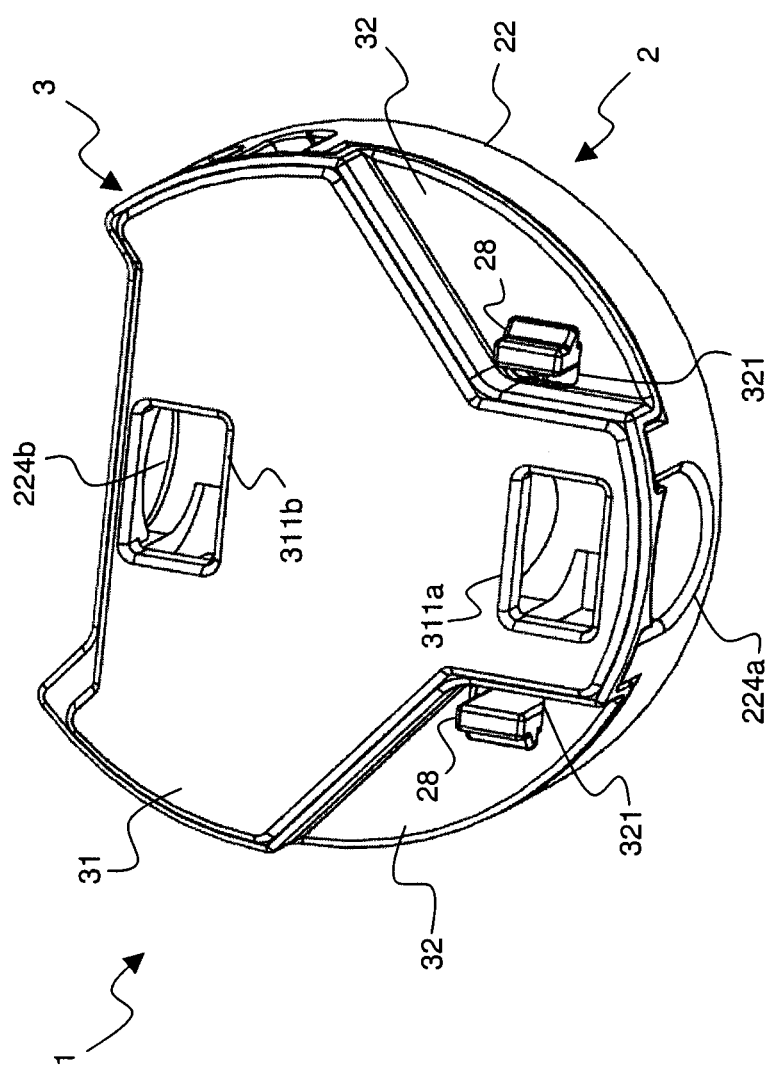
FIG. 1 is an axonometric view of an optical branching device according to a first embodiment of the present invention.

FIGS. 1 to 4 show an optical branching device 1 (referred to hereafter as a "device" for the sake of simplicity) according to a first embodiment of the present invention. The drawings are not to scale.

The device 1 comprises a base 2 and a cover 3.

The base 2 is preferably substantially circular in shape; more specifically, it is in the shape of a circle from which a circular segment with one base has been cut. The base 2 has a bottom 21 and a lateral wall 22 substantially perpendicular to the bottom 21. The bottom 21 can have an aperture 23, preferably of circular shape, positioned substantially in the centre of the bottom 21.

The base 2 comprises a central channel 24 and a number of lateral channels 25, 26 located on the bottom 21.

The central channel 24 is substantially straight and passes through the whole base 2 along its axis of symmetry. Preferably, the central channel 24 has a substantially U-shaped cross section. The opposite ends of the central channel 24 terminate in respective first recesses 224a, 224b. The first recesses 224a, 224b are also preferably U-shaped.

In the device 1 shown in FIGS. 1 to 4, by way of non-limiting example, the base 2 comprises two lateral channels 25 on one side of the central channel 24 and two lateral channels 26 on the opposite side of the central channel 24. The lateral channels 25, 26 run from an intermediate portion of the central channel 24. Preferably, the intermediate portion of the central channel 24 from which the lateral channels 25, 26 run has a length not greater than 50% of the length of an access window cut in the sheath of an optical cable, which gives an operator easy access to the optical fibres of the cable. In particular, the intermediate portion of the central channel 24 from which the lateral channels 25, 26 run has a length in the range from 1 cm to 4 cm.

The lateral channels 25, 26 extend from the central channel 24 along two oblique directions which are symmetrical with respect to the central channel 24. In particular, the lateral channels 25, 26 extend, in the longitudinal direction of the central channel 24, towards one of the first recesses 224b, and, in the transverse direction relative to the central channel 24, towards the outside of the base 2. Thus the portion of the central channel 24 opposite the recess 224b and the lateral channels 25, 26 form a substantially Y-shaped guide structure.

The lateral channels 25, 26 diverge by an acute angle from the lateral channel 24. The acute angle is preferably in the range from 30° to 60°.

In an alternative embodiment, the angle formed by the central channel 24 and each of the lateral channels 25, 26 can be approximately 90°. In this case, the guide structure is substantially T-shaped. This is possible only if the correct curvature of the optical fibres can be achieved.

In particular, depending on the type of optical fibre used, radii of curvature of the optical fibres in the range from 2 to 20 mm are feasible. If the radius of curvature is in the range from 2 mm to 7 mm, the lateral channels 25, 26 can diverge from the central channel 24 by an angle of approximately 90°. On the other hand, if the radius of curvature has to be greater than 7 mm, the lateral channels 25, 26 can diverge from the central channel by an acute angle in the range from 30° to 60°.

Figure 2:
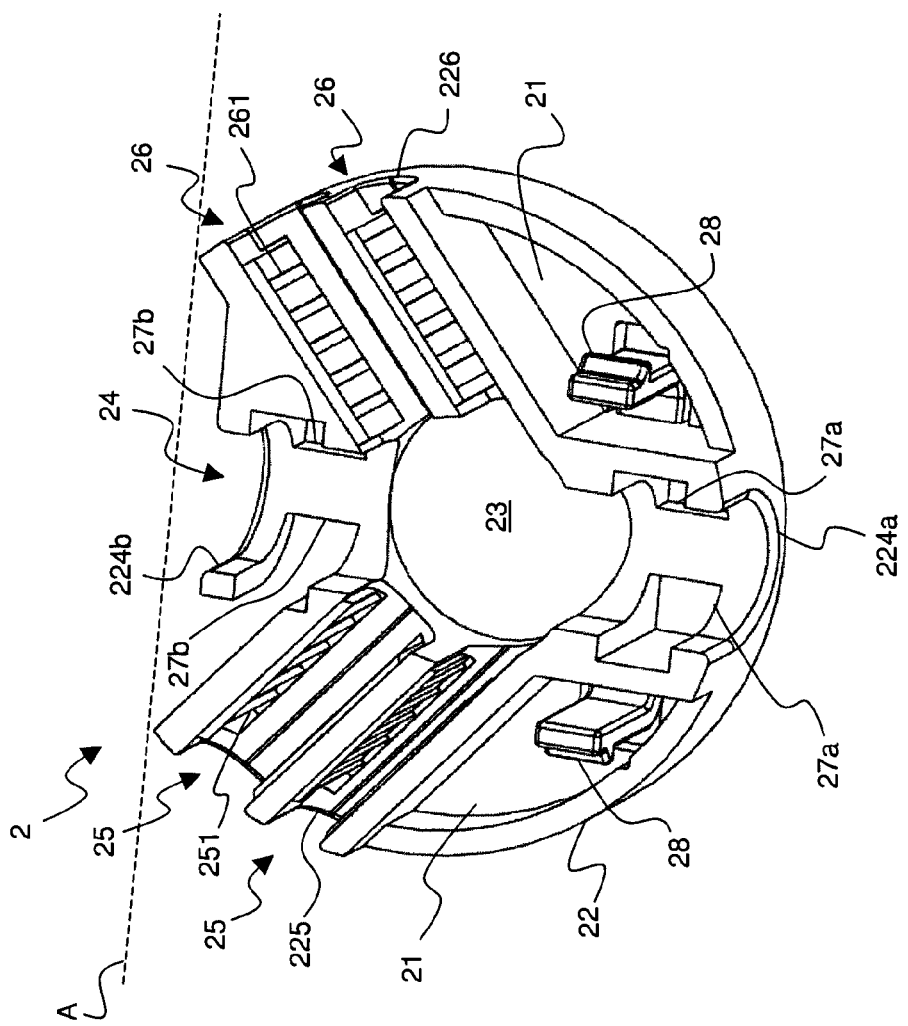
FIG. 2 is an axonometric view of the base of the device of FIG. 1.

The portion of central channel 24 opposite that which forms the Y-shaped (or T-shaped) guide structure with the lateral channels 25, 26 (in other words the portion of central channel 24 adjacent to the recess 224b), and the corresponding recess 224b, do not project in the longitudinal direction relative to the lateral channels 25, 26. In particular, as shown in FIG. 2, they do not project beyond the line A, which indicates the maximum extension of the lateral channels 25, 26 in the longitudinal direction.

Preferably, the lateral channels 25, 26 have a substantially U-shaped cross section. The end of each lateral channel 25, 26 opposite the central channel 24 terminates in a corresponding second recess 225, 226 located on the lateral wall 22 of the base 2. The second recesses 225, 226 are also preferably U-shaped. The lateral channels 25, 26 can all have the same width or can have different widths. Additionally, each lateral channel 25, 26 preferably has an inner surface with millings or teeth 251, 261 projecting towards the interior of the channel.

The lateral channels 25, 26 and the portion of central channel 24 which forms the Y-shaped guide structure with these channels have respective lateral walls whose height relative to the bottom 21 is greater than the height of the lateral wall 22 which surrounds the bottom 21.

The bottom 21 also has at least one housing for a fixing member, located along the central channel 24. In particular, the bottom 21 has two housings 27a, 27b for fixing members in the proximity of the ends of the central channel 24, in other words in the proximity of the first recesses 224a, 224b. In particular, the housing 27b located in the proximity of the recess 224b is in a non-projecting position relative to the lateral channels 25, 26 (in other words, it does not project beyond the line A shown in FIG. 2). Preferably, each housing 27a, 27b comprises a respective pair of recesses located in symmetrical positions on the two opposite sides of the central channel 24.

Additionally, the base 2 comprises fastening elements 28 configured to fix the cover 3 to the base 2. In particular, in the device 1 shown in FIGS. 1 to 4, the base 2 comprises two fastening elements 28 located in symmetrical positions on the two sides of the central channel 24. Preferably, each fastening element 28 comprises a protuberance coupled resiliently to the bottom 21 and having a tooth configured to be snap-fastened to the edge of a corresponding fastening hole in the cover 3, as explained more fully below.

Preferably, the overall dimension of the base 2 is in the range from 4 cm to approximately 6 cm. More preferably, the overall dimension is approximately 5 cm.

The base 2 can advantageously be made in one piece by moulding from a plastic material. The plastic material used can be, for example, ABS (acrylonitrile-butadiene-styrene).

With reference to FIG. 1, the cover 3 preferably has a shape and dimensions corresponding to the shape and dimensions of the base 2, in such a way that the cover 3 can be coupled to the base 2 to close the device 1.

In particular, the cover 3 comprises a central area 31 which is substantially Y-shaped and which is configured to bear on the edges of the lateral walls of the lateral channels 25, 26, and of the portion of the central channel 24 which combines with these walls to form the Y-shaped guide structure, when the cover 3 is coupled to the base 2. The central area 31 further comprises two apertures 311a, 311b. Each aperture 311a, 311b is positioned in such a way that it is aligned with a respective housing 27a, 27b when the cover 3 is coupled to the base 2.

The cover 3 also comprises two lateral areas 32 which are depressed relative to the central area 31 so as to bear on the edge of the lateral wall 22 when the cover 3 is coupled to the base 2. Each lateral area 32 comprises a corresponding fastening hole 321. When the cover 3 is placed on the base 2 and pressed on to it, each fastening hole 321 is engaged by snap-fitting with one of the fastening elements 28 of the base 2, in such a way that the cover 3 is coupled firmly to the base 2.

The cover 3 can advantageously be made from the same material and by the same process as the base 2.

With reference to FIGS. 3a, 3b and 3c, a procedure for installing the branching device 1 according to a first variant will now be described.

It is assumed that the branching device 1 is used in a junction box to extract a number of optical fibres from a riser cable 4 which passes through the junction box.

The riser cable 4 comprises a sheath 40 and a number of optical fibres which can be arranged in the sheath 40 in any known arrangement. For example, the optical fibres can be arranged in ribbons, modules, micromodules, or the like, which in turn are housed in the sheath 40.

In order to install the device 1 in the junction box, the operator opens an access window 5 in the sheath 40 of the portion of the riser cable 4 housed in the junction box. In particular, as shown in FIG. 3a, the operator makes a transverse cut and two longitudinal cuts in the sheath 40 and lifts the patch 41 of the sheath 40 delimited by the cuts. The longitudinal cuts preferably have a length of more than 5 cm, and consequently the access window 5 also has a length of more than 5 cm.

The operator also cuts off a portion 42 of the free end of the patch 41. The length of the cut-off portion 42 is preferably in the range from 1 cm to 3 cm. Thus, when the patch 41 is reclosed, the access window 5 is reclosed except for a portion 5a which remains open.

After opening the access window 5, the operator houses the riser cable 4 in the base 2 (more specifically, in the central channel 24), in such a way that the portion 5a of the access window 5 is entirely housed in the base 2 and the remaining reclosable portion of the access window 5 projects at least partially outside the base, as shown in FIG. 3b. In particular, the reclosable portion of the access window 5 projects at least partially from the base 2 through the first recess 224b opposite the portion of the central channel 24 which combines with the lateral channels 25, 26 to form the Y-shaped guide structure.

The operator then fixes the base 2 to the riser cable 4. For this purpose, the operator causes a first fixing member (not shown in the drawings) to be passed around the riser cable 4 and around the central channel 24 through the pair of apertures in the housing 27a which is located in the proximity of the recess 224a. The first fixing member can comprise, for example, a plastic wiring strap, a tape, or a metal or plastic catch. The operator then closes the first fixing member which is thus locked in the housing 27a, in such a way that the base 2 cannot slide axially relative to the riser cable 4.

When the base 2 has been fixed to the riser cable 4, the operator can lift and hold up the patch 41 so as to leave the whole access window 5 exposed, and can then easily identify the optical fibres of the riser cable 4 and extract them from the sheath 40.

The operator can then insert each extracted optical fibre into a corresponding drop tube 6.

The operator can then house each drop tube 6 with its optical fibre in one of the lateral channels 25, 26. The millings or teeth 251, 261 advantageously retain the tubes firmly in the lateral channels. The operator can select the lateral channel 25, 26 in which each drop tube 6 is to be housed, according to the position of the end user's residence relative to the junction box. Additionally, if the lateral channels 25, 26 are of different widths, the selection of the lateral channel may depend on the outside dimensions of the tube 6. Thus each tube 6 emerges from the base 2 through a corresponding second recess 225, 226 in the lateral wall 22.

The operator can then reclose the patch 41 so as to reclose the portion of the access window 5 which projects beyond the base 2.

The operator then completes the fixing of the base 2 to the riser cable 4. For this purpose, the operator causes a second fixing member (not shown in the drawings) to be passed around the riser cable 4 and around the central channel 24 through the pair of apertures in the housing 27b which is located in the proximity of the recess 224b. The second fixing member can also comprise, for example, a plastic wiring strap, a tape, or a metal or plastic catch. The operator then closes the second fixing member, which remains locked in the housing 27b. The second fixing member advantageously keeps the patch 41 closed, thus preventing the accidental reopening of the portion of access window 5 extending outside the base 2.

Figure 4A:
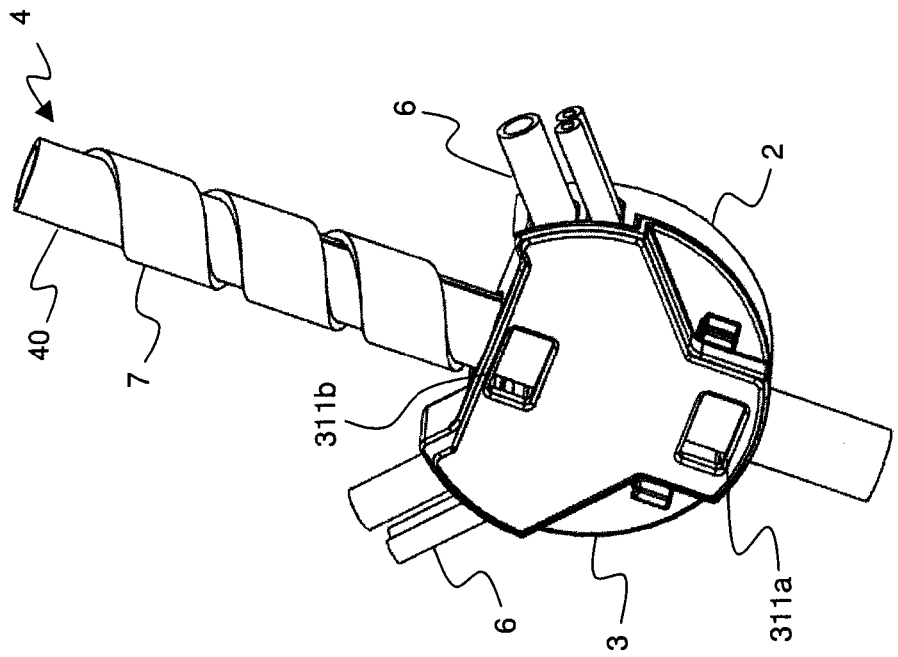
FIGS. 4a and 4b show two steps of the process of installing the device of FIG. 1, according to an advantageous embodiment.
Figure 4B:
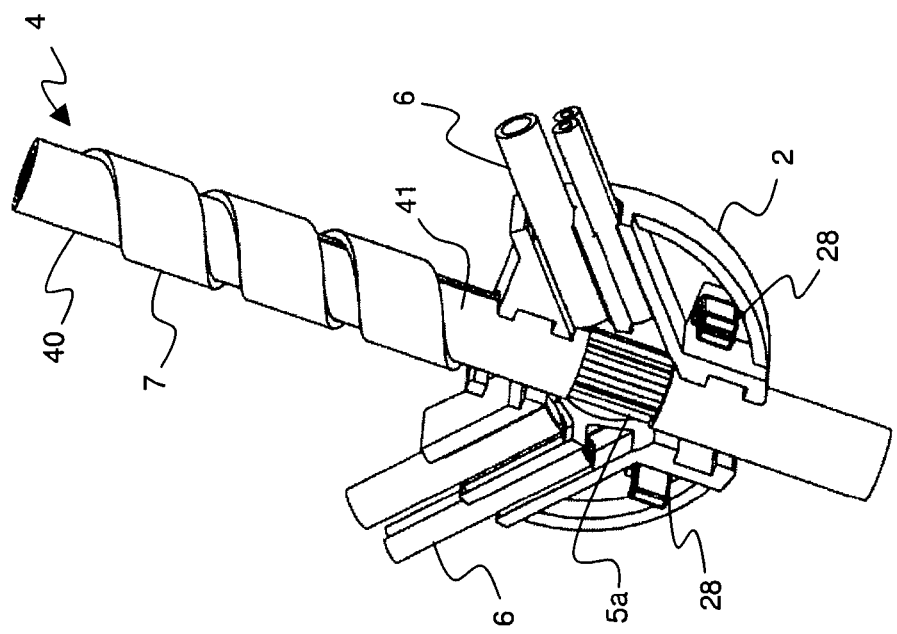

In an advantageous variant shown in FIGS. 4a and 4b, the operator can also wrap one or more strips of tape 7 around the portion of riser cable 4 which comprises the portion of access window 5 which projects from the base 2, in such a way that the whole length of the patch 41 is retained firmly in position. This makes the protection of the access window 5 more effective.

If the patch 41 is inadvertently or intentionally separated from the sheath 40 and thus leaves the access window 5 permanently exposed, this window can be covered with insulating means such as strips of insulating tape.

The operator then fixes the cover 3 to the base 2 as described above (FIGS. 3c and 4b) in order to close the device 1. The ends of the fixing members which fix the base 2 to the riser cable 4 can protrude from the cover 3 through the apertures 311a, 311b of the cover 3.

If the operator wishes to carry out further operations on the optical fibres of the riser cable 4 after the installation described above, he can remove the cover 3 and remove the second fixing member which keeps the patch 41 closed. Thus the operator can lift the patch 41 in order to expose the access window 5 completely, and can then easily carry out the operations of identifying and extracting optical fibres. When these operations are complete, the operator can reclose the access window 5 and the device 1 as described above.

Advantageously, the device 1 is highly compact and can therefore be installed in the restricted spaces which are typically available in a junction box. This is because the housing 27b for housing the fixing member which fixes the base 2 to the riser cable 4 is in a non-projecting position relative to the lateral channels 25, 26, and therefore does not add to the overall dimension of the base 2 in the longitudinal direction. Advantageously, the recess 224b through which the riser cable 4 emerges above the base 2 is in a non-projecting position relative to the lateral channels 25, 26, and therefore it does not add to the dimension of the base 2 in the longitudinal direction.

Additionally, the device 1 has the sole function of branching the optical fibres from the riser cable 4, this function being substantially concentrated in the portion 5a of the access window 5 only. The function of protecting the access window is spatially separated from the branching function, and is performed outside the device 1 by the patch 41 which covers the part of the access window 5 which emerges from the base 2. Thus the device 1 can have a longitudinal dimension which is much smaller than the length of the access window 5, and is therefore highly compact.

Figure 5:
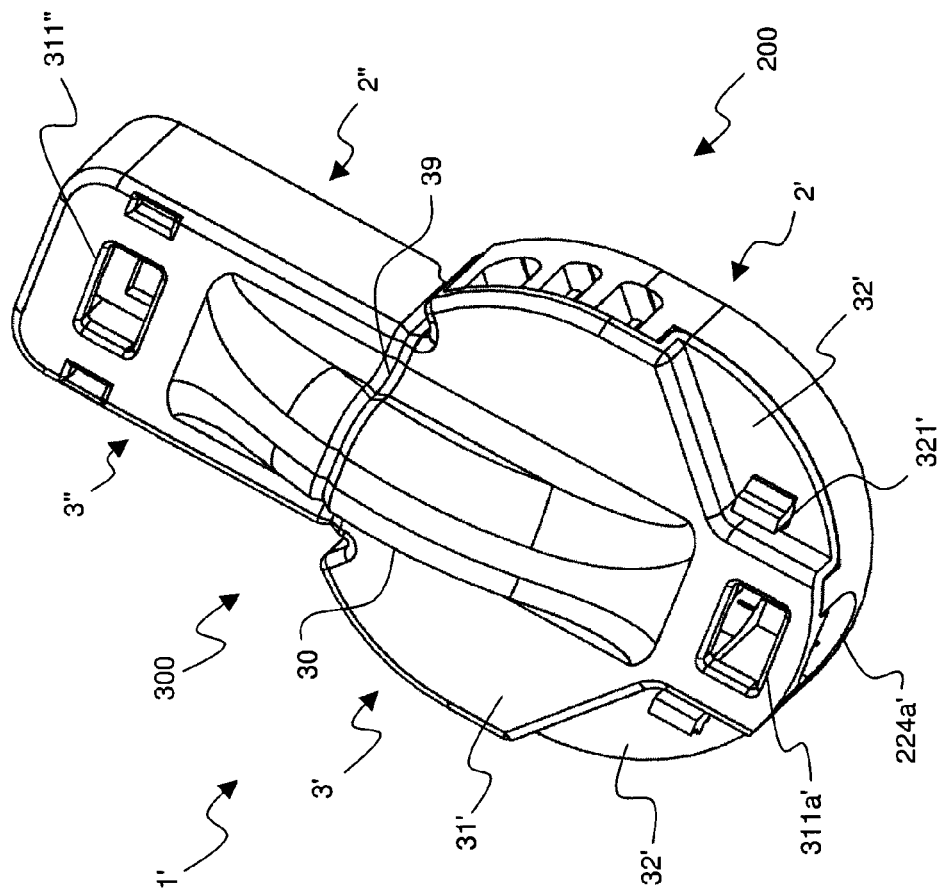
FIG. 5 is an axonometric view of an optical branching device according to a second embodiment of the present invention.
Figure 6:
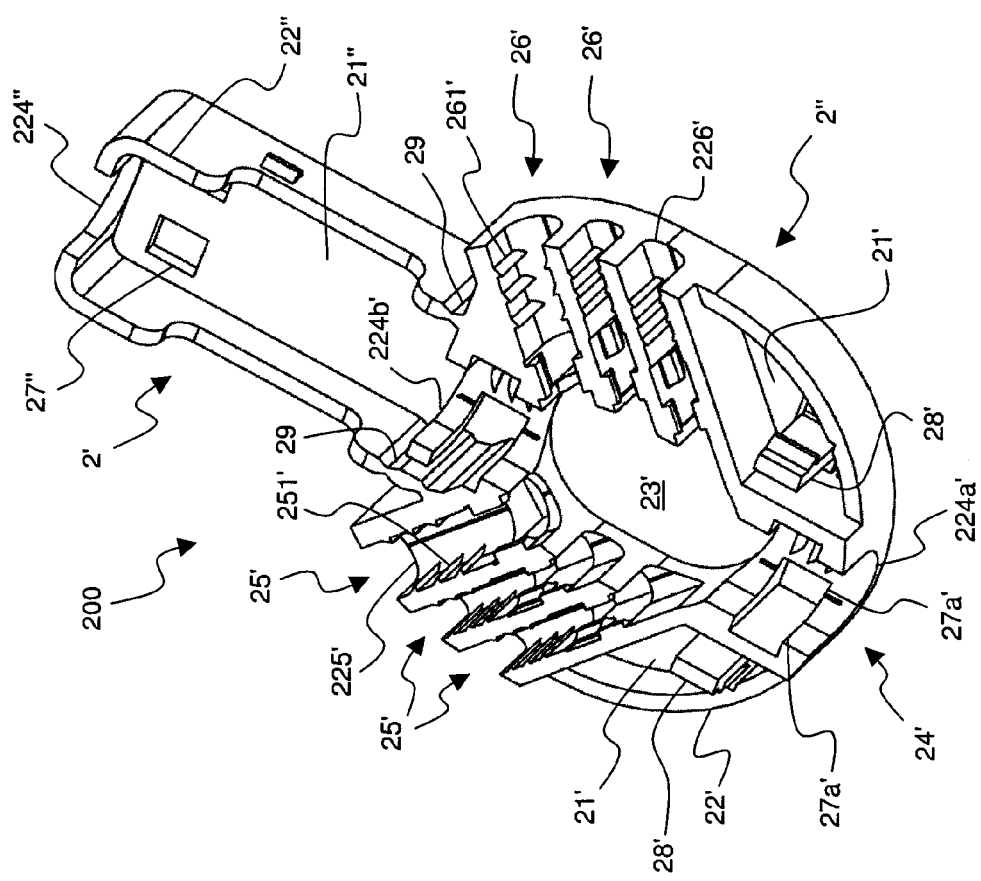
FIG. 6 is an axonometric view of the base of the device of FIG. 5.

With reference to FIGS. 5 and 6, a branching device 1' according to a second embodiment of the present invention will now be described. The device 1' comprises a base 200 and a cover 300.

The base 200 comprises a branching portion 2' and a protection portion 2".

The branching portion 2' is substantially identical to the base 2 of the device 1 according to the first embodiment of the present invention. Consequently a detailed description will not be given here. In FIGS. 5 and 6, the parts of the branching portion 2' which are similar to those of the base 2 are indicated by the same reference numbers followed by primes. In the device 1' shown in FIGS. 5 and 6, by way of example the branching portion 2' comprises three lateral channels 25' on one side of the central channel 24' and three lateral channels 26' on the opposite side of the central channel 24'.

The protection portion 2" is joined to the branching portion 2' at the position of the recess 224b' which terminates the central channel 24' at the end opposite the portion of the central channel 24' which combines with the lateral channels 25', 26' to form the Y-shaped guide structure. Preferably, the protection portion 2" is joined to the branching portion 2' along a weakened line 29. Thus the protection portion 2" can easily be detached from the branching portion 2' if necessary.

The protection portion 2" is elongate in shape and comprises a bottom 21" and a lateral wall 22". The bottom 21" has a rectangular shape with rounded corners. At the end opposite the end which is connected to the branching portion 2', the lateral wall 22" has a U-shaped recess 224" aligned with the recesses 224a', 224b' of the lateral wall 22' of the branching portion 2'. The bottom 21" has a housing 27" for a fixing member in the proximity of the recess 224". The housing 27" for a fixing member comprises two adjacent apertures. For practical purposes, the protection portion 2" forms an extension of the central channel 24'.

The cover 300 comprises a portion 3' for covering the branching and a portion 3" for covering the protection.

The branching cover portion 3' is substantially identical to the cover 3 of the device 1 according to the first embodiment of the present invention. Consequently a detailed description will not be given here. In FIG. 5, the parts of the branching cover portion 3' which are similar to those of the cover 3 are indicated by the same reference numbers followed by primes.

The protection cover portion 3" is joined to the branching cover portion 3' in such a way that, when the cover 300 is coupled to the base 200, the protection cover portion 3" covers the protection portion 2" of the base 200. Preferably, the protection cover portion 3" is joined to the branching cover portion 3' along a weakened line 39. Thus the protection cover portion 3" can easily be detached from the branching cover portion 3' if necessary. The protection cover portion 3" has an aperture 311" which is located over the housing 27" when the cover 300 is coupled to the base 200.

The cover 300 has a protuberance 30 which extends between the recesses 311a' and 311" in such a way that, when the cover 300 is coupled to the base 200, the protuberance 30 is located above the central channel 24' and its extension into the protection portion 2". The protuberance 30 advantageously provides additional space inside the device 1', in which any excess length of the optical fibres exposed through the access window can be housed.

The procedure for installing the device 1' is described below.

In order to install the device 1' in a junction box, the operator initially checks whether sufficient free space is available in the junction box to receive the device 1'.

If this is not the case, the operator can detach the protection portion 2" from the base 200, and can detach the protection cover portion 3" from the cover 300, along the respective weakened lines 29, 39. The installation of the device 1' then continues in a similar way to the installation of the device 1 according to the first embodiment. Consequently the detailed description of the installation will not be repeated.

However, if there is sufficient space in the junction box, the operator opens an access window in the sheath of the portion of the riser cable housed in the junction box, in order to expose the optical fibres contained in the cable. According to this second embodiment, the operator can completely detach the cut sheath patch from the cable, in such a way that the access window remains permanently open over its whole length.

After opening the access window, the operator houses the riser cable in the base 200 (more specifically, in the central channel 24' and in its extension into the protection portion 2"), in such a way that the access window is completely housed in the base 200.

The operator then fixes the base 200 to the riser cable. For this purpose, the operator causes a first fixing member to be passed around the riser cable and around the extension of the central channel 24' through the pair of apertures in the housing 27a' which is located in the proximity of the recess 224a'. The operator also causes a second fixing member to be passed around the riser cable and around the extension of the central channel 24' through the pair of apertures in the housing 27" which is located in the proximity of the recess 224". The operator then closes the first and second fixing members in such a way that each of them remains locked in a respective housing 27a' and 27". Thus the base 200 cannot slide longitudinally relative to the riser cable.

When the base 200 has been fixed to the riser cable, the operator can easily identify the optical fibres of the riser cable, and if necessary extract them from the sheath, through the access window.

The operator can then insert each extracted optical fibre into a corresponding drop tube.

The operator can then house each drop tube with its optical fibre in one of the lateral channels 25', 26'. In this second embodiment also, the operator can select the lateral channel 25', 26' in which each drop tube is to be housed, according to the position of the end user's residence relative to the junction box. Additionally, if the lateral channels 25', 26' are of different widths, the selection of the lateral channel may depend on the outside dimension of the tube. Thus each tube emerges from the base 200 through a corresponding second recess 225', 226' in the lateral wall 22'.

The operator then fixes the cover 300 to the base 200 in order to close the device 1'. The ends of the fixing members which fix the base 200 to the riser cable can protrude from the cover 300 through the apertures 311a', 311" of the cover 300.

If, after the installation described above, the operator wishes to carry out a further operation on the optical fibres of the riser cable, he can remove the cover 300, thus exposing the access window. In this way, the operator can easily carry out the operations of identifying and extracting the optical fibres. When these operations have been completed, the operator can reclose the device 1' as described above.

Advantageously, the device 1' can therefore be installed, if necessary, in the restricted spaces which are typically available in a junction box. This is because the function of branching the optical fibres from the riser cable is performed solely by the branching portion 2', which has a dimension smaller than the length of the access window, while the function of protecting the access window can be performed by the protection portion 2".

In particular, if sufficient space is available in the junction box, the protection portion 2" is not removed, and the device 1' performs both of the branching and protection functions.

However, if the space available in the junction box is insufficient, the protection portion 2" is removed in order to make the device 1' more compact. In the second case, the device 1' performs the branching function only, while the function of protecting the access window is implemented outside the device 1' by the sheath patch, which is not detached from the cable, and which can therefore be reclosed on to the access window. In this case, the device is highly compact, since the end of the central channel 24' opposite the end which forms the Y-shaped structure with the lateral channels 25', 26', and the housing 27b' which receives the fixing member for fixing the base 200 to the cable, do not project beyond the lateral channels 25, 26.

The invention claimed is:

1. An optical branching device capable of branching optical fibers extracted through an access window cut in a sheath of an optical cable, comprising:
   a central channel configured to house a portion of said optical cable;
   at least one lateral channel which radiates from said central channel and which is configured to house at least one of said optical fibers; and
   at least one housing capable of receiving a fixing member for fixing said device to said optical cable,
   wherein said housing is in a non-projecting position relative to said lateral channel along a longitudinal direction of said central channel.

2. The device according to claim 1, wherein said lateral channel diverges by an acute angle from said central channel.

3. The device according to claim 1, comprising at least two lateral channels located on opposite sides of said central channel relative to said longitudinal direction.

4. The device according to claim 3, wherein said at least two lateral channels are located at a portion of said access window, said portion having a length not greater than 50% of an overall length of said access window.

5. The device according to claim 1, wherein said at least one lateral channel has an inner surface with millings projecting toward the interior of the channel.

6. The device according to claim 1, further comprising a base and a cover, said central channel and said at least one lateral channel being arranged on said base, said cover capable of being coupled to said base for closing said device.

7. The device according to claim 6, further comprising a protection portion connected to said base, said protection portion being an extension of said central channel.

8. The device according to claim 7, wherein said protection portion is removably connected to said base.

9. A process for branching optical fibers from an optical cable, comprising:
   cutting an access window in a sheath of an optical cable, thereby defining a patch of said sheath;
   extracting said optical fibers from said optical cable through said access window;
   arranging said optical fibers so that said optical fibers divert from a longitudinal direction of said optical cable along a portion of said access window; and
   covering at least a further portion of said access window by said patch of said sheath.

10. The process according to claim 9, wherein said portion of said access window has a length not greater than 50% of an overall length of said access window.

* * * * *

UNITED STATES PATENT AND TRADEMARK OFFICE
CERTIFICATE OF CORRECTION

| | |
|---|---|
| PATENT NO. | : 8,615,152 B2 |
| APPLICATION NO. | : 13/335617 |
| DATED | : December 24, 2013 |
| INVENTOR(S) | : Fabio Abbiati |

Page 1 of 1

It is certified that error appears in the above-identified patent and that said Letters Patent is hereby corrected as shown below:

On the Title Page, after Item [65], the "Prior Publication Data", and before Item [51], the "Int. Cl." data, insert the following missing priority data:
--[30]        Foreign Application Priority Data
    Dec. 23, 2010      (IT) .........MI2010A 002394--.

Signed and Sealed this
Fifteenth Day of April, 2014

Michelle K. Lee
*Deputy Director of the United States Patent and Trademark Office*